United States Patent
Franc et al.

(10) Patent No.: US 10,760,763 B2
(45) Date of Patent: Sep. 1, 2020

(54) LIGHTING MODULE IN PARTICULAR FOR A HIGH-MOUNTED STOP LIGHT OF SMOOTH APPEARANCE

(71) Applicant: VALEO VISION BELGIQUE, Meslin L'Eveque (BE)

(72) Inventors: Alexandre Franc, Meslin L'Eveque (BE); Florestan Debert, Meslin L'Eveque (BE); Cindy Leclercq, Meslin L'Eveque (BE); Dirkie Sacchet, Meslin L'Eveque (BE)

(73) Assignee: VALEO VISION BELGIQUE, Meslin L'Eveque (BE)

( * ) Notice: Subject to any disclaimer, the term of this patent is extended or adjusted under 35 U.S.C. 154(b) by 0 days.

(21) Appl. No.: 16/063,552

(22) PCT Filed: Dec. 19, 2016

(86) PCT No.: PCT/EP2016/081738
§ 371 (c)(1),
(2) Date: Jun. 18, 2018

(87) PCT Pub. No.: WO2017/103267
PCT Pub. Date: Jun. 22, 2017

(65) Prior Publication Data
US 2019/0003676 A1    Jan. 3, 2019

(30) Foreign Application Priority Data
Dec. 18, 2015  (FR) ...................... 15 62864

(51) Int. Cl.
*F21S 43/14*    (2018.01)
*F21S 43/27*    (2018.01)
(Continued)

(52) U.S. Cl.
CPC ............. *F21S 43/14* (2018.01); *F21S 43/245* (2018.01); *F21S 43/26* (2018.01); *F21S 43/27* (2018.01)

(58) Field of Classification Search
CPC .......... F21S 43/14; F21S 43/27; F21S 43/245; F21S 43/26
(Continued)

(56) References Cited

U.S. PATENT DOCUMENTS

2007/0019429 A1* 1/2007 Gasquet .................. F21V 5/045
                                                           362/510
2008/0037116 A1  2/2008 Alasaarela et al.
(Continued)

FOREIGN PATENT DOCUMENTS

EP    2 587 120 A1    5/2013
FR    2 794 218 A1    12/2000
(Continued)

OTHER PUBLICATIONS

International Search Report dated Feb. 21, 2017 in PCT/EP2016/081738 filed Dec. 19, 2016.
(Continued)

*Primary Examiner* — Anabel Ton
(74) *Attorney, Agent, or Firm* — Oblon, McClelland, Maier & Neustadt, L.L.P.

(57) ABSTRACT

A lighting module intended to be placed behind a translucent or transparent outer lens or window, the module including: a place for at least one light source that is able to emit light rays; and an optical system that is able to deviate the light rays emitted by the one or more light sources so as to form a light beam along an optical axis of the module, the optical system extending in a main direction that is transverse to the optical axis and including an exit face for rays. The exit face of the optical system has in sagittal cross section a concave or convex curved general profile.

20 Claims, 2 Drawing Sheets

(51) Int. Cl.
*F21S 43/20* (2018.01)
*F21S 43/245* (2018.01)

(58) Field of Classification Search
USPC .......................................... 362/493–499, 509
See application file for complete search history.

(56) References Cited

U.S. PATENT DOCUMENTS

| | | |
|---|---|---|
| 2010/0232176 A1 | 9/2010 | Alasaarela et al. |
| 2011/0249462 A1* | 10/2011 | Koizumi ................ B60Q 1/302 |
| | | 362/519 |
| 2012/0268940 A1* | 10/2012 | Sahlin .................... G02B 5/045 |
| | | 362/290 |
| 2013/0021815 A1* | 1/2013 | Koizumi ................. F21S 43/14 |
| | | 362/511 |
| 2014/0218939 A1 | 8/2014 | Hsu |

FOREIGN PATENT DOCUMENTS

| | | |
|---|---|---|
| GB | 456 520 A | 11/1936 |
| WO | WO 2006/072885 A1 | 7/2006 |

OTHER PUBLICATIONS

Office Action dated Mar. 16, 2020 in Chinese Patent Application No. 201680072522.X with English translation.

\* cited by examiner

LIGHTING MODULE IN PARTICULAR FOR A HIGH-MOUNTED STOP LIGHT OF SMOOTH APPEARANCE

The invention relates to the field of lighting and signaling lights, in particular for motor vehicles. More particularly, the invention relates to a lighting module intended to be placed in a housing of a signaling-light device such as a rear lamp of a motor vehicle. Even more particularly, the invention relates to a lighting module for a high-mounted stop lamp that is in particular intended to be placed behind a rear windshield of a motor vehicle.

Published patent document FR 2 614 969 A1 discloses a signaling lamp of large illuminating extent, such as for example a stop lamp for a motor-vehicle rear windshield (commonly also called a third stop lamp). It comprises a light source of the incandescent-bulb type, a transparent cambered first optical element encircling the light source and a transparent generally planar second optical element. The first optical element comprises an entrance face, which is able to receive the rays of the light source, and an exit face containing Fresnel echelons or facets that are able to uniformly distribute the light of the light source along the second optical element. The latter is generally planar and comprises a rear entrance face, also with Fresnel echelons that are configured to deviate the incident light rays along the optical axis of the signaling lamp. The second optical element is in fact a collimator. The signaling lamp of this teaching is advantageous in that it seeks, with simple means, to uniformly distribute the light along the main direction of the lamp, which direction is transverse to the optical axis. The collimation of the rays in the vertical direction is ensured by striations that extend generally horizontally over the entrance faces of the first and/or second optical elements. However these striations are the cause of luminous losses and nonuniformities in the light beam.

Published patent document FR 2 794 218 A1 discloses a signaling lamp, which is also of large illuminating extent, of the third-stop-lamp type. This lamp comprises a light source of the incandescent-bulb type, a collimator and a planar-convex lens that is able to make the parallel light rays exiting from the collimator converge on a focal segment. To do this, the front face of the lens, which is generally convex, comprises a series of curved surfaces or pillow lenses that extend vertically. These surfaces allow the rays to converge along a focal segment that is generally perpendicular to the direction of the pillow lenses, and therefore generally horizontal. The focal segment is located on the interior face of the window on which the lamp is intended to be mounted. The zone of the window that receives the lamp may therefore be opacified, with the exception however of a slit corresponding to the focal segment. The interior of the lamp may thus be hidden from the exterior of the vehicle by the opacifying layer or partition placed on the window. In addition, the lamp is made almost invisible, when it is turned off, from the exterior of the vehicle. This design, although advantageous, however has a few drawbacks, such as in particular the fact that it requires an opacifying layer or partition to be present and that, therefore, the illuminated area is necessarily thin.

The objective of the invention is to mitigate at least one drawback of the prior art, and in particular of the aforementioned prior art. More particularly, the objective of the invention is to provide a lighting device such as a high-mounted stop-signaling lamp that has a satisfactory optical efficacy, produces a beam of a satisfactory uniformity and provides more freedom with respect to its turned-off and turned-on appearance when it is placed behind a transparent or translucent outer lens or window that may, where appropriate, be tinted.

In this respect, one subject of the invention is a lighting module intended to be placed behind a translucent or transparent outer lens or window, in particular a rear windshield of a motor vehicle, said module comprising: a place for at least one light source that is able to emit light rays; and an optical system that is able to deviate the light rays emitted by the one or more light sources so as to form a light beam along an optical axis of the module, said optical system extending in a main direction that is transverse to the optical axis and comprising an exit face for rays; noteworthy in that the exit face of the optical system has in sagittal cross section a concave or convex curved general profile.

According to one advantageous embodiment of the invention, the exit face of the optical system is free of optical patterns.

According to one advantageous embodiment of the invention, the exit face of the optical system is smooth.

According to one advantageous embodiment of the invention, the exit face of the optical system is grained and preferably has a roughness $R_a$ lower than 20 micrometers.

According to one advantageous embodiment of the invention, the exit face of the optical system includes smooth zones and grained zones.

According to one advantageous embodiment of the invention, the curved profile of the exit face of the optical system is in a plane parallel to the optical axis and to the main direction of said system and/or in a plane parallel to the optical axis and perpendicular to said main direction.

According to one advantageous embodiment of the invention, the optical system comprises at least one translucent or transparent optical element with an entrance face for the light and an exit face, at least one of said faces comprising Fresnel echelons.

According to one advantageous embodiment of the invention, the exit face of the or of one of the optical elements forms the exit face of the optical system.

According to one advantageous embodiment of the invention, the optical system comprises a translucent or transparent first optical element with an entrance face that is able to receive, preferably directly, the rays emitted by the one or more light sources, said entrance face comprising Fresnel echelons.

According to one advantageous embodiment of the invention, the Fresnel echelons on the entrance face of the first optical element have annular and/or curved profiles, said optical element comprising an exit face with rectilinear Fresnel echelons.

According to one advantageous embodiment of the invention, the Fresnel echelons on the exit face of the first optical element are perpendicular to the main direction of the optical system.

According to one advantageous embodiment of the invention, the optical system comprises a translucent or transparent second optical element with an entrance face that is able to receive the rays originating from the first optical element, and an exit face forming the exit face of the optical system.

According to one advantageous embodiment of the invention, the entrance face of the second optical element comprises rectilinear Fresnel echelons.

According to one advantageous embodiment of the invention, the Fresnel echelons on the entrance face of the second optical element are perpendicular to the main direction of the optical system.

According to one advantageous embodiment of the invention, the second optical element comprises two sub-elements that are separated by an air-filled cavity, the first sub-element bearing the entrance face and the second sub-element bearing the exit face forming the exit face of the optical system.

Another subject of the invention is a lighting device for a motor vehicle, said device comprising a housing and a lighting module, noteworthy in that the lighting module is according to the invention.

The measures of the invention are advantageous in that they allow a generally thin and horizontally wide signaling light beam (such as in particular for a third stop lamp or high-mounted stop lamp) that does not generate moiré patterns or other nonuniformities to be produced. In addition, the concave or convex shape of the exit face of the module allows it to be generally smooth and, thus, its appearance when turned-off is discreet and uniform. More particularly, with respect to the lamp of document FR 2 614 969 A1 mentioned above in the section relating to the prior art, the fact that the exit face is convex or concave allows the signaling beam to be spread and to be made more uniform. The convexity or concavity of the exit face participates in the vertical deviation of the rays and thus makes it possible to do without Fresnel echelons. These echelons are the source of light losses and nonuniformity. With respect to the lamp of document FR 2 794 218 A1, which was also mentioned above in the section relating to the prior art, the fact that the exit face is convex or concave allows the formation of moiré patterns, due to the pillow lenses, to be avoided. In addition, the absence of pillow lenses on the exit face makes its turned-off appearance uniform and discreet, increasing design flexibility, in particular as regards the height of the lighting device and also its position with respect to the rear windshield. Specifically, in the teaching of FR 2 794 218 A1, the module is located away from the rear windshield and the latter has an opacifying layer with a thin horizontal slit. According to the invention, the outer lens or window is devoid of an opaque partition.

Other features and advantages of the present invention will be better understood from the description and drawings, in which.

In the following description, the notions of verticality and horizontality are expressed when the lighting device is oriented in a mounting position on the vehicle. The orientation of the lighting device is moreover clearly defined in the various figures.

Figure 1:
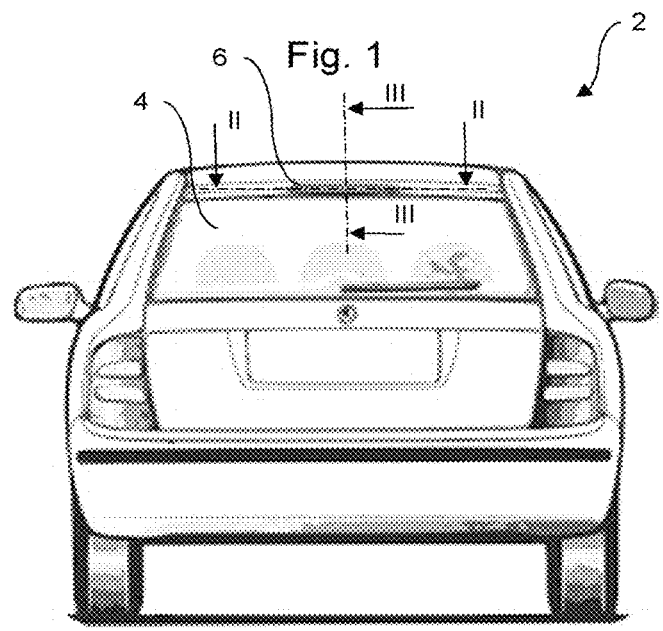
FIG. 1 is a rear view of a motor vehicle equipped with a high-mounted stop lamp according to the invention.

FIG. 1 is a view of the rear of a motor vehicle 2. In a conventional and known way, the vehicle comprises a rear windshield 4, the latter possibly being fastened to the body or being on a rear opening such as a tailgate. The vehicle 2 comprises a signaling lamp 6, which is placed at the top of the rear windshield 4, and more precisely behind said windshield. It is in the present case a question of what is commonly called a "third stop lamp", or a high-mounted stop lamp, with reference to the two conventional stop lamps placed lower down to the left and to the right. This high-mounted stop lamp or "third stop lamp" is also designated a CHMSL (acronym for the expression "Center High-Mounted Stop Lamp". Such a high-mounted stop lamp may also be installed at the bottom of the rear windshield, on the parcel shelf, or be mounted in the body, above the rear windshield or even at the top of the trunk lid. When it is intended to be placed behind the rear windshield, the high-mounted stop lamp includes a housing the aperture of which is closed by the rear windshield, whereas in the case where it is integrated into the body, it includes a housing closed by a translucent or transparent outer lens, which may, where appropriate, be red in color. According to the invention, this outer lens is devoid of an opaque partition.

Figure 2:
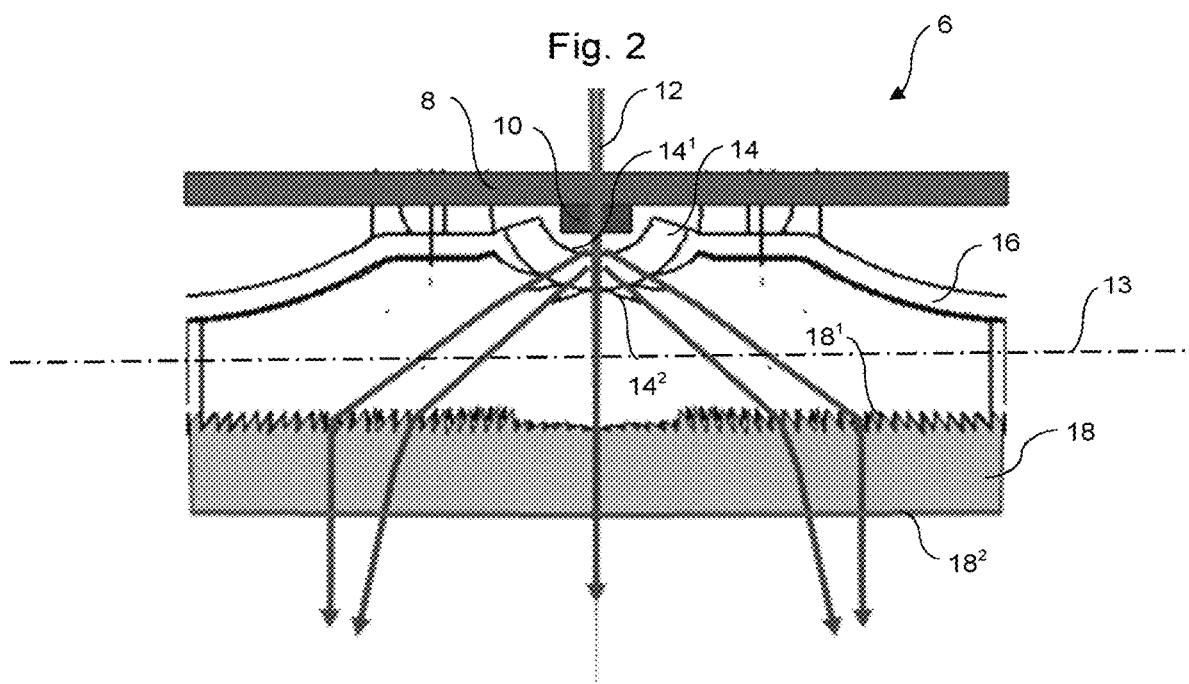
FIG. 2 is a view in cross section along II-II of the lamp of FIG. 1, according to the invention.

FIG. 2 is a partial view of a transverse, i.e. longitudinal (with respect to the vehicle) and horizontal, cross section along II-II of the lighting device or lamp 6 of FIG. 1.

Figure 3:
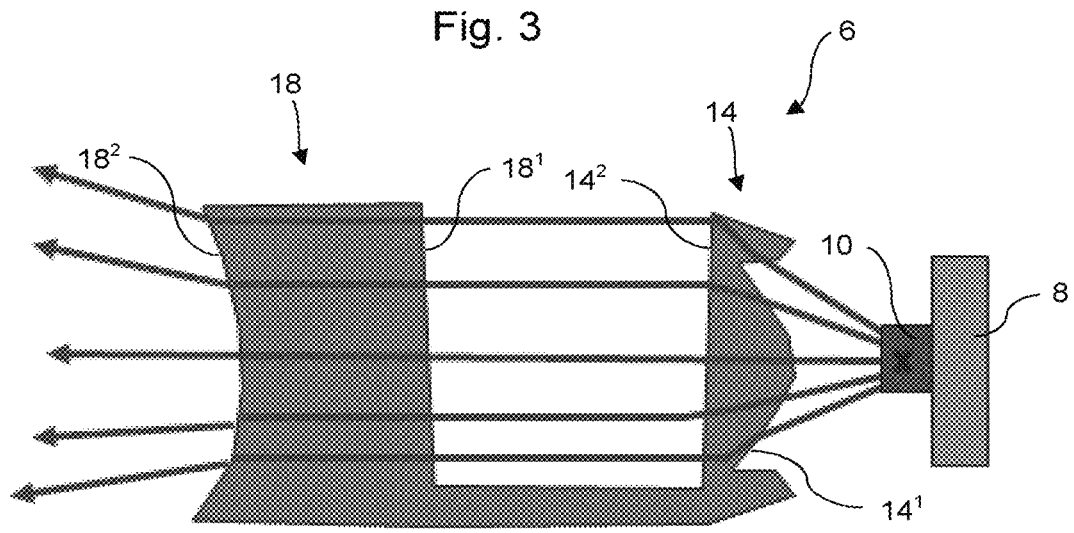
FIG. 3 is a view in cross section along III-III of the lamp of FIG. 1, according to the invention.

FIG. 3 is a view of a sagittal, i.e. longitudinal (with respect to the vehicle) and vertical, cross section along III-III of the lamp 6 of FIG. 1.

The signaling lamp 6 extends in a main direction 13 that corresponds to the horizontal when the lamp is in its position mounted on the vehicle. This main direction 13 also corresponds to the horizontal in FIG. 2. The lamp comprises a holder 8 of one or more light sources 10. It may be a question of light-emitting diodes (LEDs) or even of incandescent bulbs. In the case where the light sources are LEDs, the holder 8 may be a printed circuit board (PCB). In the case where a plurality of light sources are present, the latter may be placed side-by-side or even distributed in the main direction of the lamp. The one or more light sources are configured to illuminate in a main direction parallel to the optical axis 13 of the signaling lamp 6.

The signaling lamp 6 also comprises an optical system that essentially consists of a first optical element 14 and of a second optical element 18. The first optical element consists of a translucent or transparent material, similarly to a lens, with an entrance face $14^1$ and an exit face $14^2$. In the present case, the first optical element 14 is generally curved over a sector comprised between 90° and 180°, so as to collect most of the light emitted by the light source 10. The entrance face $14^1$ may be generally smooth or, as is shown in FIG. 3, comprise what are called Fresnel echelons that are configured to deviate the rays originating from the one or more light sources essentially vertically. The exit face $14^2$ advantageously comprises what are called Fresnel echelons or striations, as is shown in FIG. 2, so as to control horizontal spreading of the light rays. A shield 16 may be provided about the first optical element 14.

The second optical element 18 is placed so as to receive the light rays deviated by the first optical element 14. Just like the first optical element, the second optical element 18 consists of a translucent or transparent material, similarly to a lens, with an entrance face $18^1$ and an exit face $18^2$. The second optical element is advantageously generally planar, and extends in the main direction of the lamp 6. The entrance face $18^1$ comprises what are called Fresnel echelons or striations so as to be able to deviate the rays originating from the first optical element 14 essentially horizontally. These striations or echelons therefore extend essentially vertically. They may however have a certain curvature centered on the optical axis 12.

According to one variant (not shown), the second optical element 18 comprises two sub-elements that are separated by an air-filled cavity, the first sub-element bearing the entrance face $18^1$ and the second sub-element bearing the exit face $18^2$ forming the exit face of the optical system 14, 18. This advantageously allows the esthetics of the module when it is turned off to be improved, in that the Fresnel patterns borne by the entrance face $18^1$ are less easily visible through the exit face $18^2$ and through the transparent outer lens or window.

The exit face 18² of the second optical element 18 is generally concave. More precisely, the profile of its cross section along a vertical longitudinal or sagittal plane (FIG. 3) is generally curved and concave. The vertical profile in question has a single concavity. It may correspond to a circular arc or to a more complex function. Its average radius may be comprised between 10 and 50 mm. The shape of this profile advantageously extends over more than 50%, and preferably over more than 80% of the length of the exit face 18² in question. It will however be understood that the profile in question may vary along the main axis of the lamp. The cross section of the exit face 18² in a horizontal longitudinal or transverse plane (i.e. along the section line II-II in FIG. 1) may also have a concave and curved profile. In this case, this horizontal profile also then has a single concavity with an average radius of curvature higher than that of the vertical profile. This radius may be comprised between 7 and 12 meters.

As may be seen in FIG. 3, the rays exiting from the first optical element 14 and entering into the second optical element 18 are essentially in horizontal planes. They thus propagate essentially in horizontal planes through the thickness of the translucent or transparent material of the second optical element 18. The concave exit face 18² disperses the rays vertically and thus ensures a distribution of the light rays. This effect is particularly advantageous when the lamp has a small height (along the vertical direction).

With reference to the above discussion in which the horizontal profile of the exit face may also be concave, such a concave profile has a similar effect to that of the vertical profile, namely that of spreading the light rays horizontally.

Alternatively to what was just described above, the vertical or sagittal profile of the exit face of the second optical element may be convex. In this case, the effect will be to make the rays converge toward a zone in front of and close to the signaling lamp. The rays will then diverge vertically, similarly to the signaling lamp of concave profile. The convex profile may correspond to a circular arc or to a more complex function. Its average radius may be comprised between 10 and 50 mm. The convex shape of the vertical profile advantageously extends over more than 50%, and preferably over more than 80% of the length of the exit face in question. It will however be understood that the profile in question may vary along the main axis of the lamp. The cross section of the exit face in a horizontal longitudinal or transverse plane (i.e. along the section line II-II of FIG. 1) may also have a convex and curved profile. In this case, this horizontal profile then also has a single convexity with an average radius of curvature higher than that of the vertical profile. This radius may be comprised between 7 and 12 meters.

Generally, the entire area or only certain zones of the exit face 18² of the second optical element 18 may be grained, for example with a roughness $R_a$ lower than 20 micrometers, preferably lower than 10 micrometers and higher than 3 micrometers. This fine graining scatters the rays, making it possible to avoid or decrease the impact of any moiré patterns or nonuniformities.

According to one essential feature of the invention, the optical system is a single part made of man-made polymer: the first optical element and the second optical element, and where appropriate both sub-elements of the second optical element, are integrally formed and made of the same material. They are joined by a base. The optical system is produced by injecting molding man-made polymer. Preferably, the polymer is polycarbonate (PC) or polymethyl methacrylate (PMMA).

Although one particularly preferred application of the invention is to the production of a high-mounted stop lamp for a motor-vehicle, whether it be of the type placed in a housing behind the rear windscreen shield of the vehicle or of the type with a housing closed by a translucent or transparent outer lens and integrated into the body on the exterior of the vehicle, the lighting module may also be used to produce interior lighting devices including a housing closed by a translucent or transparent outer lens.

The invention claimed is:

1. A lighting module intended to be placed behind a translucent or transparent outer lens or window, said module comprising:
   a place for at least one light source that is configured to emit light rays; and
   an optical system that is configured to deviate the light rays emitted by the one or more light sources to form a light beam along an optical axis of the module, said optical system extending in a main direction that is transverse to the optical axis and comprising a first optical element and a second optical element;
   wherein:
      the first optical element includes a first entrance face to deviate the light rays that are emitted by the light source along the optical axis and a first exit face having Fresnel echelons to control spreading of the light rays along the main direction, and
      the second optical element includes a second entrance face having Fresnel echelons to receive and deviate the light rays originating from the first optical element, and a second exit face with a curved profile to distribute the light rays away from the optical system, the light rays being distributed away in one of a dispersing way and a converging way.

2. The module as claimed in claim 1, wherein the first optical element comprises a translucent or transparent material, at least one of said faces of the first optical element comprising Fresnel echelons.

3. The module as claimed in claim 1 wherein the second exit face of the second optical element forms an exit face of the optical system.

4. The module as claimed in claim 3, wherein the exit face of the optical system is free of optical patterns.

5. The module as claimed in claim 4, wherein the exit face of the optical system is smooth.

6. The module as claimed in claim 4, wherein the exit face of the optical system is grained and preferably has a roughness $R_a$, lower than 20 micrometers.

7. The module as claimed in claim 4, wherein the exit face of the optical system includes smooth zones and grained zones.

8. The module as claimed in claim 1, wherein the first entrance face of the first optical element comprises Fresnel echelons.

9. The module as claimed in claim 8, wherein the Fresnel echelons on the first entrance face of the first optical element have annular and/or curved profiles, said first optical element comprising the first exit face with rectilinear Fresnel echelons.

10. The module as claimed in claim 9, wherein the Fresnel echelons on the first exit face of the first optical element are perpendicular to the main direction of the optical system.

11. The module as claimed in claim 1, wherein the second optical element comprises a translucent or transparent material.

12. The module as claimed in claim 1, wherein the second entrance face of the second optical element comprises rectilinear Fresnel echelons.

13. The module as claimed in claim 12, wherein the Fresnel echelons on the second entrance face of the second optical element are perpendicular to the main direction of the optical system.

14. The module as claimed in claim 3, wherein the second optical element comprises two sub-elements that are separated by an air-filled cavity, the first sub-element bearing the second entrance face and the second sub-element bearing the second exit face forming the exit face of the optical system.

15. A lighting device for a motor vehicle, said device comprising: a housing and a lighting module, wherein
the housing is configured to contain the light module; and
the lighting module includes at least one light source that is configured to emit light rays, and an optical system that is configured to deviate the light rays emitted by the one or more light sources to form a light beam along an optical axis of the module, said optical system extending in a main direction that is transverse to the optical axis and comprising a first optical element, a shield and a second optical element,
wherein:
the first optical element includes a first entrance face to deviate the light rays that are emitted by the light source along the optical axis and a first exit face to control spreading of the light rays along the main direction;
the second optical element includes a second entrance face to receive and deviate the light rays transmitted by the first optical element, and a second exit face with a curved profile to transmit the light rays away from the optical system; and
the shield is connected to the first optical element and positioned to cover the second optical element.

16. The module as claimed in claim 3, wherein the exit face of the optical system has one of a concave profile and a convex profile.

17. The module as claimed in claim 1, wherein the first entrance face of the first optical element is smooth.

18. The module as claimed in claim 1, wherein the first optical element is curved over a sector comprised between 90° and 180°.

19. The module as claimed in claim 16, wherein the exit face of the optical system has the concave profile with a radius between 10 mm and 50 mm so that the light rays are distributed away in the dispersing way.

20. The module as claimed in claim 16, wherein the exit face of the optical system has the convex profile with a radius between 10 mm and 50 mm so that the light rays are distributed away in the converging way.

* * * * *